(12) United States Patent
Hoshi

(10) Patent No.: US 7,580,594 B2
(45) Date of Patent: Aug. 25, 2009

(54) OPTICAL MODULATION ELEMENT AND OPTICAL MODULATION DEVICE HAVING THE SAME

(75) Inventor: Hikaru Hoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/175,826

(22) Filed: Jul. 18, 2008

(65) Prior Publication Data

US 2009/0022446 A1  Jan. 22, 2009

(30) Foreign Application Priority Data

Jul. 19, 2007 (JP) .............................. 2007-188278

(51) Int. Cl.
*G02F 1/035* (2006.01)

(52) U.S. Cl. .................. 385/3; 385/9; 385/14; 385/41; 385/45; 385/132

(58) Field of Classification Search ................. 385/1–4, 385/8–9, 14, 40–41, 45, 50, 129–132
See application file for complete search history.

(56) References Cited

U.S. PATENT DOCUMENTS 7,310,468 B2 * 12/2007 Kittaka et al. ............... 385/131

FOREIGN PATENT DOCUMENTS

JP  2004-317540 A  11/2004

OTHER PUBLICATIONS

E. Yablonovitch, Inhibited Spontaneous Emission in Solid-State Physics and Electronics, Physical Review Letters, May 18, 1987, pp. 2059-2062, vol. 58, No. 20.

E. Camargo et al., 2D Photonic crystal thermo-optic switch based on AlGaAs/GaAs epitaxial structure, Optics Express, Feb. 23, 2004, pp. 588-592, vol. 12, No. 4.

K. Yoshino, Optical and Electro-Optical Engineering Contact, 2001, pp. 658-666, vol. 39, No. 11 (In Japanese without English translation).

H. Nakamura et al., Ultra-fast photonic crystal/quantum dot all-optical switch for future photonic networks, Optics Express, Dec. 27, 2004, pp. 6606-6614, vol. 12, No. 26.

M. Notomi et al., Optical bistable switching action of Si high-Q photonic-crystal nanocavities, Optics Express, Apr. 4, 2005, pp. 2678-2687, vol. 13, No. 7.

S. Kim et al., Strain-tunable photonic band gap crystals, Applied Physics Letters, May 14, 2001, pp. 3015-3017, vol. 78, No. 20.

(Continued)

*Primary Examiner*—Frank G Font
*Assistant Examiner*—Michael P Mooney
(74) *Attorney, Agent, or Firm*—Rossi, Kimms & McDowell LLP

(57) ABSTRACT

An optical modulation element includes a waveguide defined based on a defect in a photonic crystal, a carrier conducting region for conducting a carrier to the waveguide, an electrode for injecting a carrier into the carrier conducting region, and a current control unit for controlling the quantity of carrier to be conducted to the waveguide, wherein the photonic crystal and the electrode are made of a material containing $TiO_2$ as a main composition, and wherein the current control unit functions to change the refractive index of a medium constituting the waveguide in accordance with the quantity of carrier conducted to the waveguide, thereby to modulate the light propagated through the waveguide.

10 Claims, 11 Drawing Sheets

OTHER PUBLICATIONS

B.S. Jeong et al., Conductivity in transparent anatase $TiO_2$ films epitaxially grown by reactive sputtering deposition, Solid-State Electronics, 2003, pp. 2275-2278, vol. 47.

S. Iwamoto, The Fusion of Photonic Nanostructure and MEMS Structure, Optronics, 2005, pp. 127-131, No. 11 (with English translation of Introduction).

* cited by examiner x-y SECTION
(SECTION i)

x-y SECTION
(SECTION ii)

SECTION V

OPTICAL MODULATION ELEMENT AND OPTICAL MODULATION DEVICE HAVING THE SAME

FIELD OF THE INVENTION AND RELATED ART

This invention relates to an optical modulation element using a photonic crystal having a refractive-index periodic structure and also to an optical modulation device having the same.

The light intensity modulation or switching requires fast response speed and high operation efficiency. In the wavelength range for optical communication, a response speed of sub-microsecond or less than nano-second is required.

In order to meet these requirements, proposals have been made to use an optical modulation element based on a photonic crystal, by which the response speed can be increased or the operation efficiency can be improved. This is because, if a photonic crystal is used, the optical properties can be changed largely by a small change of refractive index such that the light can be controlled (see Japanese Laid-Open Patent Application No. 2004-317540).

The photonic crystal is a structure which has a period less than the wavelength and which can control the transmission/reflection characteristic of electromagnetic waves ("Physical Review Letters", Vol. 58, pp. 2059, 1987). The optical transmission/reflection characteristic can be controlled by lowering the period of the structure to the order of the wavelength of light. The wavelength band having approximately 100% reflectivity regardless of the incidence angle is called a photonic band gap (PBG).

Furthermore, the field strength can be concentrated at a defect portion by providing a point defect or a line defect in the photonic crystal to disturb the period thereof. If a point defect is provided, it functions as a resonator. If a line defect is provided, it functions as a waveguide.

The photonic band gap changes depending on the dimension of the photonic crystal, the refractive index of the material constituting the photonic crystal, the space filling factor of the material, the lattice cyclic intervals, and the lattice shape, for example. Namely, the optical transmission/reflection characteristic can be controlled by controlling these parameters.

An example of a method of dynamically controlling the optical transmission/reflection characteristic of the photonic crystal is modulating the refractive index of the material constituting the photonic crystal. As regards the method of modulating the refractive index of the material, a method based on the electro-optic effect that a ferroelectric material provides is known (Japanese Laid-Open Patent Application No. 2004-317540). Furthermore, a method based on refractive index variation due to the thermo-optic effect ("Optics Express", Vol. 12, No. 4, pp. 588, 2004) or a method based on the refractive index anisotropy of a liquid crystal material ("Optical Technology Contact", Vol. 39, No. 11, pp. 658, 2001) is known. Furthermore, a method based on the nonlinear optical effect of the quantum dot ("Optics Express", Vol. 12, No. 26, pp. 6606, 2004) or a method based on the refractive index variation due to a carrier concentration change by photo-excitation ("Optics Express", Vol. 13, No. 7, pp. 2678, 2005) is known. Furthermore, there is a method in which objects having different refractive indices are placed close to each other based on MEMS, thereby to modulate the effective refractive index of the photonic crystal ("OPTRONICS", No. 11, pp. 127, 2005). Also, there is a method of distorting the lattice arrangement of a photonic crystal by a piezo-material ("Applied Physics Letters", Vol. 78, No. 20, pp. 3015, 2001).

In the optical modulation element disclosed in Japanese Laid-Open Patent Application No. 2004-317540, electrodes are so disposed to efficiently apply a voltage only to a particular portion of the microstructure, and light is modulated by locally changing the refractive index of the ferroelectric material. However, since a metal electrode having good conductivity should be used as the material constituting the electrode, there is a large waveguide loss due to the absorption by the metallic material.

In consideration of this, a protective layer having a refractive index lower than that of the ferroelectric material is provided above the ferroelectric waveguide portion, so as to reduce the superposition of the electromagnetic field distribution of the waveguiding mode with the electrode and to reduce the waveguiding loss. With the provision of the protective layer above the ferroelectric waveguide, the refractive index difference between the core and the cladding becomes smaller and the waveguiding mode confinement to the interior of the waveguide is weakened. In other words, the electromagnetic-field distribution of the waveguiding mode is broadened. As a result of this, the peripheral region of the waveguiding-mode electromagnetic-field distribution overlaps with the electrode, to cause a waveguiding loss.

The protecting layer thickness may be enlarged to avoid this. However, in that occasion, since a very thick protective layer as compared with the minute period of the photonic crystal structure must be provided, it becomes very difficult to locally apply a voltage.

Thus, it becomes difficult to locally modulate the refractive index by locally applying a voltage only to a particular portion of the photonic crystal. Alternatively, it becomes necessary to apply a high voltage for the modulation.

On the other hand, the lattice structure may be made deeper than the waveguiding mode diameter, thereby to reduce the overlap of the electromagnetic-field distribution of the waveguiding mode and the electrode and to reduce the waveguiding loss. However, this needs a high technique to produce a high aspect-ratio structure in the ferroelectric substrate.

Furthermore, generally, the refractive index modulation based on the field strength modulation using a ferroelectric material is operable in an order of 1 microsecond to sub-microsecond. However, by putting a ferroelectric material into the microstructure, the crystal quality will degrade due to a defect of the crystal structure of the ferroelectric material, causing a problem of slower response speed.

Additionally, in the disclosed technique, two or more materials are laminated or used as a filling. If different types of materials are used in combination, adhesive properties between the different types of materials or a structural strain due to the difference of internal stress will be a problem.

Particularly, in the element having a minute structure as of a photonic crystal, these problems will be notable. Namely, because of the structural strain due to incomplete adhesion of different materials or the difference of internal stress, crystal distortion or a defect of the ferroelectric material is caused to slow down the efficiency of the electro-optic effect. Furthermore, short-circuit or disconnection of the circuitry occurs. As a result, a desired characteristic is not accomplished.

Furthermore, a high technique for precisely fabricating different types of materials is needed, and yet the manufacture steps are more complicated. Therefore, the yield of devices will be slowed down.

In Japanese Laid-Open Patent Application No. 2004-31754 as described above, there are problems in respect to the waveguiding loss, applied voltage, response speed, and processing characteristics of different materials.

In "Optics Express", Vol. 12, No. 4, pp. 588, 2004, the refractive index modulation is performed using a thermo-optic effect, and a metal is used as a heater for heating the material. The refractive index is modulated by turning on/off the heater. Thus, a Mach-Zehnder interference type optical switch is realized.

However, use of a metal for a heater is not preferable since it increases the waveguiding loss. Even if the electrode is made of a material having no absorption loss, the provision of a heater on the photonic crystal waveguide results in that the waveguide structure has an asymmetric refractive index distribution with respect to the vertical direction of the slab, causing a larger waveguiding loss.

As a result of this, the contrast of optical signals at the switching on/off will be degraded. Furthermore, since the response speed is slow as of an order of 100 microseconds, the applicability is restricted. As described above, there are problems in respect to the waveguiding loss and response speed.

"Optical Technique Contact", Vol. 39, No. 11, pp. 658, 2001, discusses modulation based on the refractive index anisotropy that a liquid crystal material provides. However, the response speed depends on the liquid crystal material, and the speed is slow as of millisecond order. Furthermore, the resistance to high-intensity light is low, and the quality of the liquid crystal material is easily degraded under a high-temperature environment. Thus, there are problems in respect to the response speed and environmental stability of the material.

"Optics Express", Vol. 12, No. 26, pp. 6606, 2004, discusses an optical switch using InAs quantum dot. By putting control light into a nonlinear optical waveguide including quantum dot, a super-high-speed optical switch of pico-second order can be realized.

However, in order to control the operation wavelength, the size and density of the quantum dot as well as the quantum dot material must be adequately controlled. This requires high manufacturing technique. Furthermore, for the switching, it is necessary to introduce excitation light from the outside. This means that, when integration is going to be done, an enormous light source is necessary and, therefore, it becomes very difficult to make the circuitry area small. Thus, there are problems in respect to the manufacturing technique and integration.

On the other hand, a refractive-index modulation technique based on a semiconductor material such as a compound semiconductor material is known. For example, as a technique for controlling the emission wavelength of a semiconductor DBR laser, a change of refractive index can be induced by applying an electric current to a diffraction grating portion, and the laser emission wavelength can be changed thereby.

This is because the carrier density in the semiconductor material changes and, as a result, the polarization varies to induce the refractive index change. This phenomenon is known as a carrier plasma effect (or a band filling effect). The speed that the refractive index change is induced is determined by the diffusion speed of the carrier, and a response speed of nano-second order can be realized.

For an optical element using the carrier plasma effect, mainly a compound semiconductor material and Si are used. However, there is no report in regard to the element usable in the visible light region. This is because all the materials used conventionally have absorbency in the visible-light wavelength region.

On the other hand, "Optics Express", Vol. 13, No. 7, pp. 2678, 2005, discusses a structure for inducing a carrier plasma effect based on light injection. Through strong excitation caused by injecting excitation light from the outside, super-high-speed response of sub-pico second order may be realized.

However, there remain problems: the energy necessary for the switching is large; the number of excitement light sources such as lasers necessary for integration of a plurality of switching elements is extraordinarily large; the structure is complicated and reduction in size is very difficulty, and so on. Thus, problems are present in respect to the operating wavelength band, operation energy and integration.

"OPTRONICS", No. 11, pp. 127, 2005, discusses a refractive index modulation method using MEMS. A refractive index member is disposed adjacent a light guide and, by putting the refractive index member close to the light guide by use of mechanical means, the effective refractive index to which the light guide is responsive is changed and the optical switching is realized. However, the response speed is slow as of microsecond order, and therefore the applicability is restricted.

In "Applied Physics Letters", Vol. 78, No. 20, pp. 3015, 2001, an effective refractive index which the photonic crystal itself shows is modulated based on the lattice constant control using a piezoelectric device. However, there are problems that the response speed is very slow as of microsecond order and a slow speed and the driving voltage is large.

SUMMARY OF THE INVENTION

In accordance with an aspect of the present invention, there is provided an optical modulation element, comprising: a waveguide defined based on a defect in a photonic crystal; a carrier conducting region configured to conduct a carrier to said waveguide; an electrode configured to inject a carrier into said carrier conducting region; and a current control unit configured to control a quantity of carrier to be conducted to said waveguide; wherein said photonic crystal and said electrode are made of a material containing $TiO_2$ as a main composition, and wherein said current control unit is configured to change a refractive index of a medium constituting said waveguide in accordance with the quantity of carrier conducted to said waveguide, thereby to modulate light propagated through said waveguide.

The carrier conducting region may include an n-type $TiO_2$ portion and a p-type $TiO_2$ portion sandwiching said waveguide therebetween, wherein an insulating member may be disposed at a zone of the region sandwiched by the n-type $TiO_2$ portion and the p-type $TiO_2$ portion, other than said waveguide.

The electrode may be made of $TiO_2$ doped with Nb.

The photonic crystal may be formed on a substrate made of a material having a resistance higher than said photonic crystal.

The waveguide may have a structure that a single waveguide is branched into two waveguides which are then combined into a single waveguide, wherein light being propagated through one of the two branched waveguides may be modulated by changing a refractive index of the material constituting said one waveguide.

The refractive index of a medium constituting one of two waveguides may be changed to modulate light being propagated through the one waveguide, such that, through a branch where light being propagated along the two waveguides is branched, light may be selectively directed to one of the two waveguides.

In accordance with another aspect of the present invention, there is provided an optical modulation element, comprising:

a waveguide defined based on a defect in a photonic crystal; a resonator defined based on a defect in a photonic crystal; a carrier conducting region configured to conduct a carrier to said resonator; an electrode configured to inject a carrier into said carrier conducting region; and a current control unit configured to control a quantity of carrier to be conducted to said resonator; wherein said photonic crystal and said electrode are made of a material containing $TiO_2$ as a main composition, and wherein said current control unit is configured to change a refractive index of a medium constituting said resonator in accordance with the quantity of carrier conducted to said waveguide, thereby to change a resonance mode frequency of said resonator to control waveguiding from said waveguide to said resonator.

In accordance with a further aspect of the present invention, there is provided an optical modulation element, comprising: a waveguide defined based on a defect in a photonic crystal; a refractive-index modulating region provided around said waveguide; a carrier conducting region configured to conduct a carrier to said refractive-index modulating region; an electrode configured to inject a carrier into said carrier conducting region; and a current control unit configured to control a quantity of carrier to be conducted to said refractive-index modulating region; wherein said photonic crystal and said electrode are made of a material containing $TiO_2$ as a main composition, and wherein said current control unit is configured to change a refractive index of a medium constituting said refractive-index modulating region in accordance with the quantity of carrier conducted to said refractive-index modulating region, thereby to modulate light propagated through said waveguide.

In accordance with a yet further aspect of the present invention, there is provided an optical modulation device, comprising: an optical modulation element as recited above; a light source member; and an optical coupling member configured to couple said optical modulation element and said light source member with each other.

At least a portion of said light source member or of said optical coupling member may be comprised of a photonic crystal.

Briefly, in accordance with the present invention, an optical modulation element which is operable in the visible light region, which enables high-speed light control and which is operable very easily.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
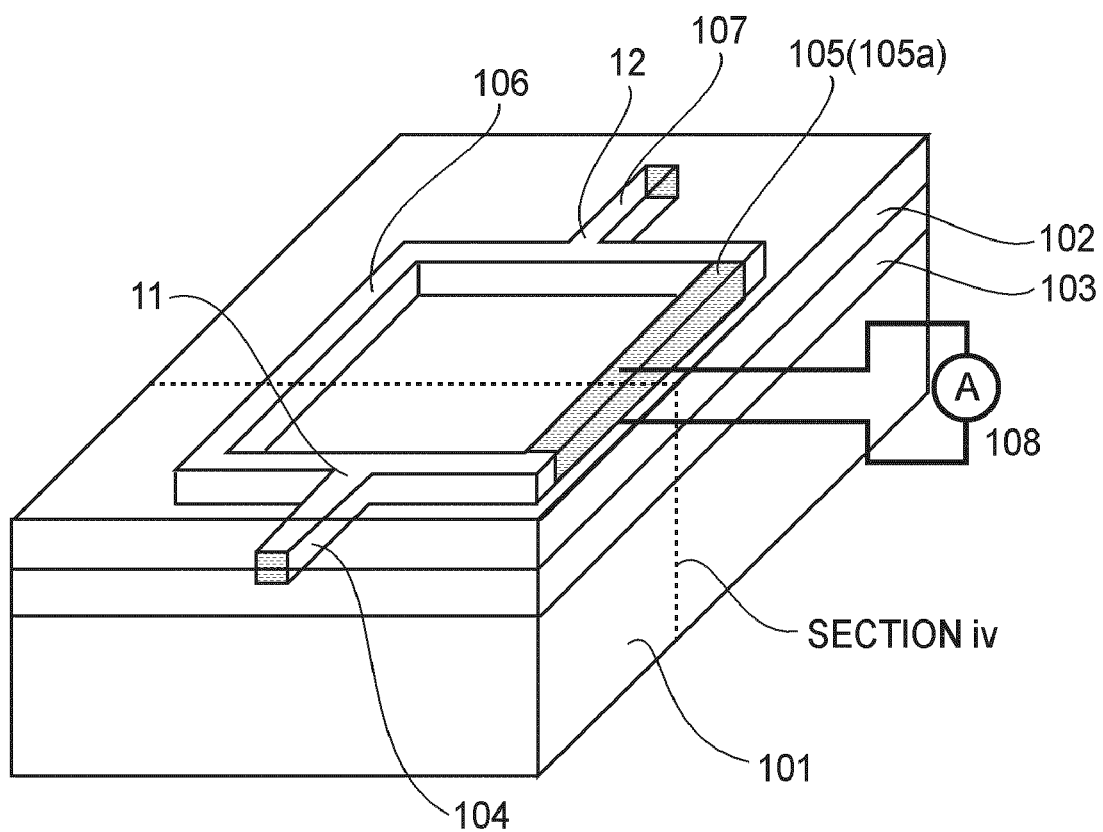
FIG. 1 is a schematic diagram of an optical modulation element according to a first embodiment of the present invention.

FIG. 1 is a schematic diagram of a main portion of a first embodiment of the present invention. It is a schematic diagram of a main portion of a Mach-Zehnder type optical modulation element having a three-dimensional photonic crystal and a current control unit.

The optical modulation element of the present embodiment has such structure that light inputted from an input waveguide is selectively outputted from an output waveguide through a waveguide.

The photonic crystal according to the present embodiment comprises a refractive-index periodic structure, and a photonic band gap is presented.

The waveguide is comprised of an isolated defect member which disturbs the refractive-index periodic structure in the photonic crystal.

The optical modulation element of Mach-Zehnder type is an application of the principle of a Mach-Zehnder type interferometer. More specifically, one light path (waveguide) is divided into two light paths (waveguides). After a phase difference is applied to the light in only one light path (waveguide), the paths are combined into one light path (waveguide) whereby the light intensity is modulated and outputted.

If in this optical modulation element there is no optical path length difference between the two light paths or the difference is an integral-number multiple of the optical wavelength, light of the same intensity as the incident light is emitted. However, if the optical path length difference corresponds to a half wavelength of the optical wavelength or a half wavelength plus an integral-number multiple of the wavelength, the phases are cancelled each other and the intensity of the emitted light is equal to zero.

In the optical modulation element of Mach-Zehnder type of the present embodiment, a carrier is injected into titanium oxide ($TiO_2$) material of the semiconductor which is the medium forming one light path (waveguide) to change the refractive index, thereby to control the phase of the light being propagated through one of the waveguides.

The optical modulation element of the first embodiment is provided with three-dimensional photonic crystals 102 and 103 disposed on a substrate 101. Furthermore, waveguides 104, 105, 106 and 107 defined by line defects are provided inside the photonic crystals 102 and 103.

The photonic crystals 102 and 103 are provided on the substrate 101 which is made of a material having a resistance larger than the photonic crystals 102 and 103.

In FIG. 1, light is incident from the input waveguide 104 side. At furcation 11, the light is branched into a waveguide 105 and a waveguide 106. The branched lights are coupled at a connection 12, and then the combined light is emitted from an output waveguide 107.

A portion 105a of the waveguide 105 is a refractive-index modulation region which is made of n-type $TiO_2$ and p-type $TiO_2$ materials, and a current control unit 108 is connected thereto. By using the current control unit 108, the quantity of carrier to be supplied to the portion 105a of the waveguide 105 is controlled and the refractive index of the refractive-index modulation region 105a is modulated.

The optical modulation element of the present embodiment has carrier conducting regions 1022 and 1032 which are provided at least in a portion of the photonic crystals 102 and 103, and electrodes 1021 and 1031 for injecting carriers into the carrier conducting regions 1022 and 1032.

Furthermore, it includes a refractive-index modulation region 105a in which the refractive index of the medium is variable and which provides a waveguide in response to carrier injection into the carrier conducting region. Furthermore, it includes a current control unit 108 for controlling the quantity of carrier to be injected into the refractive-index modulation region 105a of the waveguide.

The refractive-index modulation region 105a may be formed as the whole of or a portion of the waveguide 105 being branched. Alternatively, it may be formed around the branched waveguide 105.

The main composition of the material constituting the photonic crystals 102 and 103, waveguides 104-107, carrier conducting regions 1022 and 1032, and electrodes 1021 and 1031 is $TiO_2$.

In the present embodiment as described above, a material containing $TiO_2$ as the main composition is used as a material constituting a portion of the optical modulation element.

$TiO_2$ is a material having an electric conductivity and semiconductivity. Although $TiO_2$ itself is n-type semiconductor, it may function as a conductive material if a very small amount of metal such as Nb is doped into $TiO_2$. Furthermore, if the composition is transformed to $TiO_{2-x}$ through strong reduction of $TiO_2$, it has a characteristic as a p-type semiconductor ("Solid-State Electronics", Vol. 47, pp. 2275, 2003).

Next, use of $TiO_2$ as the main composition will be explained.

In terms of the theoretical mixture ratio (stoichiometry), $TiO_2$ is constituted at the rate of one Ti atom and two oxygen atoms.

If a very small amount of metal such as Nb is doped into $TiO_2$, it has a chemical composition $Ti_{1-x}Nb_xO_2$. This means that, in terms of the theoretical mixture ratio, it is constituted at the rate of Ti atoms of a number (1-x), Nb atoms of a number x, and two oxygen atoms.

Here, with regard to the material having $TiO_2$ as the main composition, the value of x in the aforementioned theoretical mixture ratio should be less than 0.5. For example, in order that the main composition can be $TiO_2$ if Nb is doped, generally the chemical composition should have a value of x in the range from zero to around 0.2.

Figure 2:
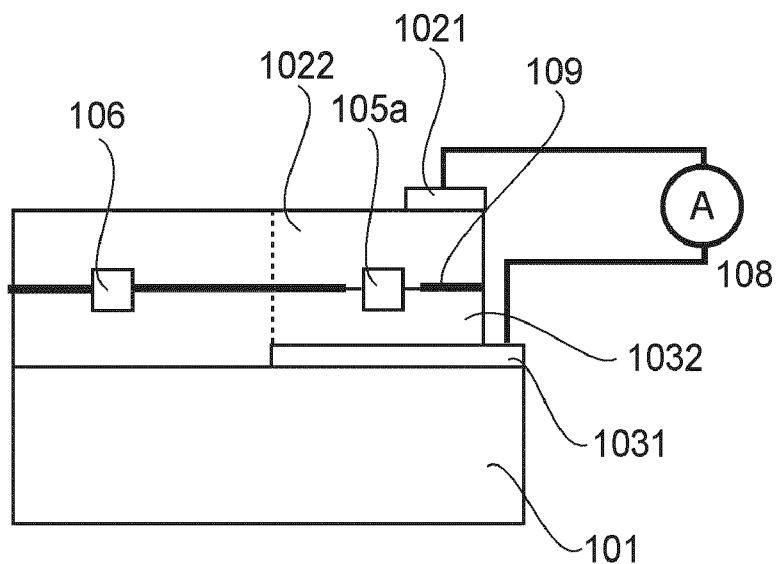
FIG. 2 is a schematic diagram of the optical modulation element of the first embodiment.

FIG. 2 is a schematic diagram of the structure along a section iv depicted by a dotted line in FIG. 1. The portion around the waveguide 105 (refractive-index modulation region 105a) which functions to apply a phase difference based on the modulation of the refractive index, is comprised of a carrier conducting region (photonic crystal) 1032 made of n-type $TiO_2$ and a carrier conducting region (photonic crystal) 1022 made of p-type $TiO_2$.

Connected to these carrier conducting regions 1032 and 1022 made from photonic crystals are electrode 1031 and 1021 for carrier injection.

A current control unit 108 is connected to the electrodes 1031 and 1021. By controlling the quantity of carrier to be injected through the current control unit 108, the refractive index of the waveguide 105 and the refractive-index modulation region 105a adjacent the waveguide 105 can be changed.

Furthermore, for efficient carrier injection into the refractive-index modulation region 105a, it may be effective to provide a current constricting structure (insulating member) 109 made of an electrically insulating material in a region other than the waveguide.

In the present embodiment, the materials constituting the carrier conducting regions 1022 and 1032 are n-type $TiO_2$ and p-type $TiO_2$.

The refractive-index modulation region 105a of the waveguide is sandwiched between the carrier conducting region 1032 made of n-type $TiO_2$ and the carrier conducting region 1022 made of p-type $TiO_2$. The insulating material 109 sandwiched between the carrier conducting region 1032 made of n-type $TiO_2$ and the carrier conducting region 1022 made of p-type $TiO_2$ is provided in the region other than the refractive-index modulation region 105a (the region other than the waveguide 105).

The energy band-gap of the carrier conducting region 1032 made of n-type $TiO_2$ and the carrier conducting region 1022 made of p-type $TiO_2$ has a structure for confining the carrier in the refractive-index modulation region 105a.

In this embodiment, as described above, the quantity of carrier injection is modulated by the current control unit 108, by which the refractive index of the medium of the refractive-index modulation region 105a is modulated. In this manner, an optical modulation element by which the power intensity of light to be outputted from the output waveguides 107 can be modulated is accomplished.

Figure 3:
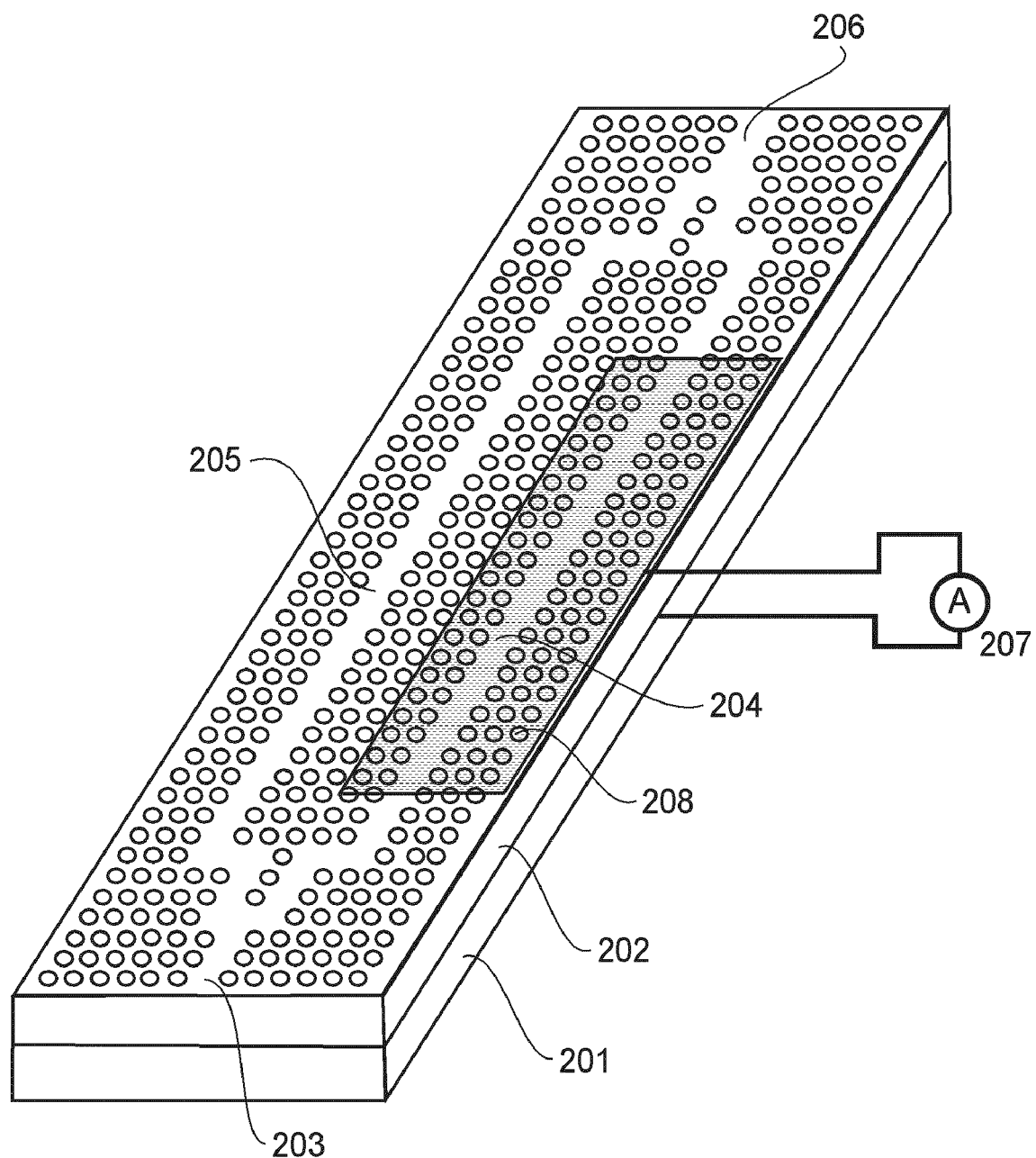
FIG. 3 is a schematic diagram of the optical modulation element of the first embodiment.

In the first embodiment, the photonic crystal may have a two-dimensional structure as shown in FIG. 3. The optical modulation element of FIG. 3 has a substrate 201, a photonic crystal 202, waveguides 203, 204, 205 and 206 provided by a line defect, a current control unit 207, and a refractive-index modulation region 208 of the waveguide.

By controlling the quantity of carrier injection into the refractive-index modulation region 208 of the waveguide through the current control unit 207, the refractive index of the medium in refractive-index modulation region 208 is changed, and the phase of light propagated through the waveguide 204 is modulated.

As a result, the light intensity to be outputted from the output waveguide 206 is modulated in accordance with the phase modulation having been made in the line-defect waveguide 204.

Furthermore, in aforementioned embodiment, the substrate 201 should preferably be made of a material having no absorbency with respect to the waveguiding mode frequency. With regard to the operation in the visible light region, for example, a material being transparent and having small conductivity such as quartz or glass is preferable. It avoids carrier outflow to the substrate and assures more effective carrier injection. In order to control radiation mode toward the substrate side and for reducing carrier outflow, the substrate may be removed to provide an air bridge structure.

There is no limitation in regard to the size of the refractive-index modulation region for inducing the carrier concentration change to apply refractive index modulation. It may be provided on the whole substrate surface or in a portion thereof. However, for more effective disposition, the refractive-index modulation region should preferably be disposed at and adjacent the waveguide which is defined by a line defect. This is because it assures efficient refractive index modulation to the line-defect waveguide portion.

Furthermore, it is effective to provide an electric current constricting structure for enabling efficient carrier injection to the refractive index modulation region.

As described above, the light inputted from the input waveguide is branched into two waveguides and a phase difference is applied in the refractive-index modulation region to the light propagated through one of the waveguides, by which the intensity of light emitted from the output waveguide where one waveguide and the other waveguide are combined is controlled.

With this structure, an optical modulation element which enables high-speed and high-efficiency modulation is accomplished.

Embodiment 2

Figure 4:
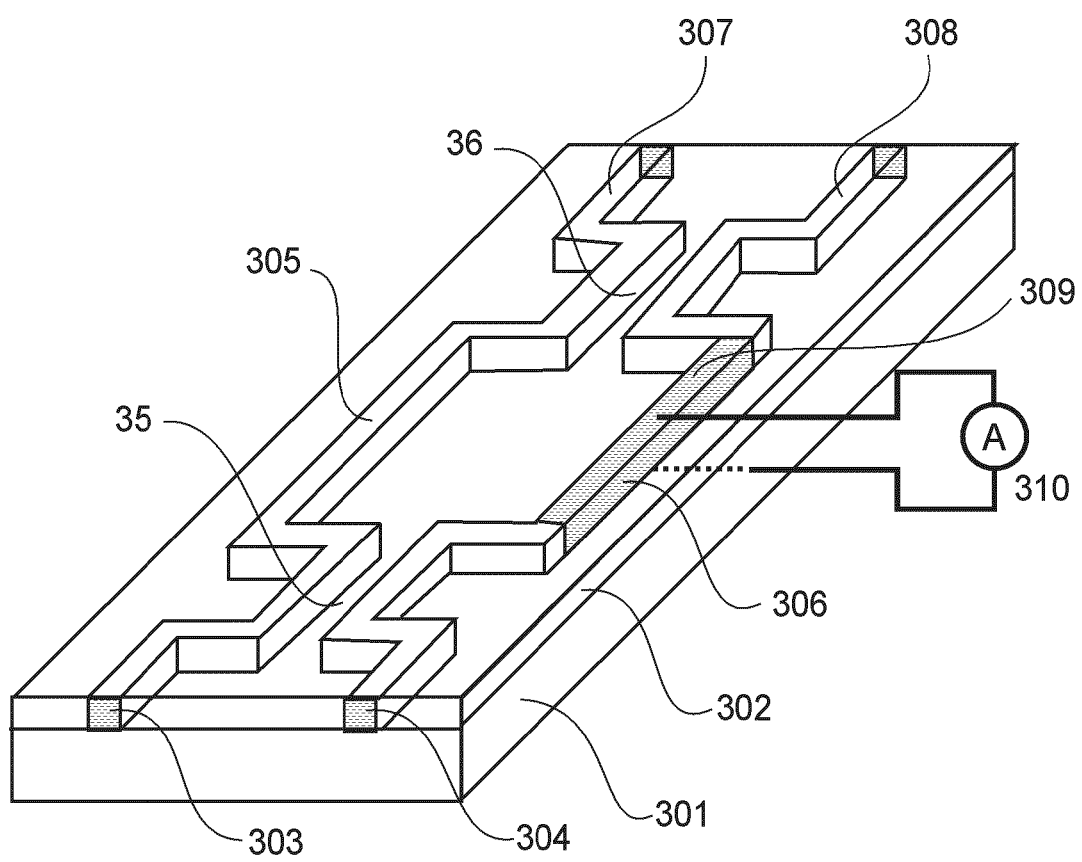
FIG. 4 is a schematic diagram of an optical modulation element according to a second embodiment of the present invention.

FIG. 4 is a schematic diagram of a main portion of a Mach-Zehnder type optical modulation element having a three-dimensional photonic crystal structure and a current control unit, in a second embodiment of the present invention.

The Mach-Zehnder type optical modulation element of in FIG. 4 is comprised of a substrate 301 and a three-dimensional photonic crystal 302. There are waveguides 303, 304, 305, 306, 307 and 308 comprised of a three-dimensional line defect, a refractive-index modulation region 309 and furcations 35 and 36 which are provided inside the photonic crystal 302.

Here, denoted at 303 and 304 are input waveguides, denoted at 305 and 306 are waveguides, and denoted at 307 and 308 are output waveguides. Denoted at 310 is a current control unit.

The principle of operation of the Mach-Zehnder type optical modulator of the present embodiment will be explained.

Although the description will be made here with respect to a case where light is inputted from the input waveguide 303, the operation will be similar even if the light is inputted from the input waveguide 304. When the light is inputted from the input waveguide 303, the light is branched by the furcation 35 into two waveguides 305 and 306. The furcation 35 comprises a 3 dB coupler which has been designed so that the light output intensities of a ratio 1:1 are supplied into the two waveguides 305 and 306. The light propagating through the waveguide 305 reaches a furcation 36.

On the other hand, in the refractive-index modulation region 309, which is in a portion of the waveguide 306, the refractive index changes depending on the quantity of carrier injected by the current control unit 310.

Thus, the light being propagated through the waveguide 306 reaches the furcation 36 while a phase difference is added thereto depending on the quantity of change of the refractive index. If the phase difference of the lights passing through the waveguide 305 and waveguide 306 is zero or it corresponds to an integral-number multiple of the wavelength, light is outputted from the output waveguides 307.

On the other hand, if the phase difference of the lights passing through the waveguide 305 and waveguide 306 is a half wavelength or it corresponds to a half wavelength pulse an integral-number multiple of the half wavelength, light is outputted from the output waveguides 308.

It should be noted that the optical modulation element of the present embodiment may be a two-dimensional photonic crystal similar to one illustrated in FIG. 3.

In the present embodiment as described above, by controlling the phase of the lights passing through the waveguides 305 and 306, an optical modulation element in which the output waveguide for outputting the light can be switched is realized.

Embodiment 3

Figure 5:
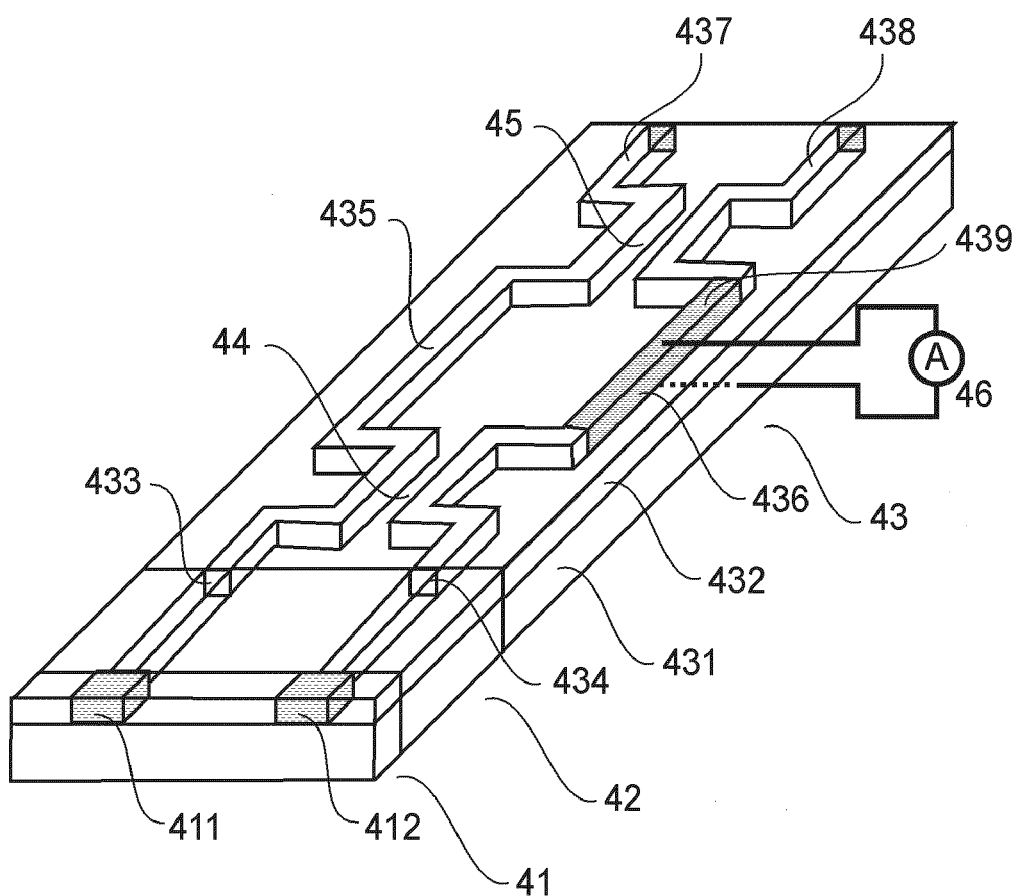
FIG. 5 is a schematic diagram of an optical modulation device according to a third embodiment of the present invention.

FIG. 5 is a schematic diagram of a main portion of an optical modulation device according to a third embodiment of the present invention.

The third embodiment is comprised of a light source 41, an optical modulation element operable in the wavelength band of visible light, and an optical coupling member 42.

In FIG. 5, the light source member 41 comprises two light sources 411 and 412. The optical coupling member 42 couples the light source member 41 and the optical modulation element 43 with each other. The used wavelength of the light emitted from the light sources 411 and 412 provided in the light source member 41 is at the longer-wavelength side of the band gap (near 350 nm) of $TiO_2$.

If it is 350 nm or more, the light absorption can be ignored. Thus, there is no limitation if it is within the visible-light wavelength region not shorter than the wavelength 350 nm (the region from the wavelength 350 nm to the wavelength 750 nm).

The Optical coupling member 42 is a region for efficiently coupling the lights from the light sources 411 and 412 into the waveguide 433 and 434.

The optical modulation element 43 includes a substrate 431, a photonic crystal 432, waveguides 433, 434, 435, 436, 437 and 438, a refractive-index modulation region 439 of the waveguide, and furcations 44 and 45. Furthermore, it includes a current control unit 46. The principle of operation is approximately the same as the second embodiment.

In the present embodiment, a portion of the light source member 41 or at least a portion of the optical coupling member is comprised of a photonic crystal.

By modulating the refractive index in the refractive-index modulation region 439 through the current control unit 46, relative to the light from the light source 411, the phase difference of the light is controlled. The light output port is switched to the output waveguide 437 or output waveguide 438. This is also the case with the light from the light source 412.

In the present embodiment as described above, an optical modulation device which is operable at high speed in the visible light wavelength band is accomplished.

Embodiment 4

A specific structure of a photonic crystal in which a three-dimensional photonic crystal and a waveguide formed by a line defect therein are provided, will be explained.

Figure 6:
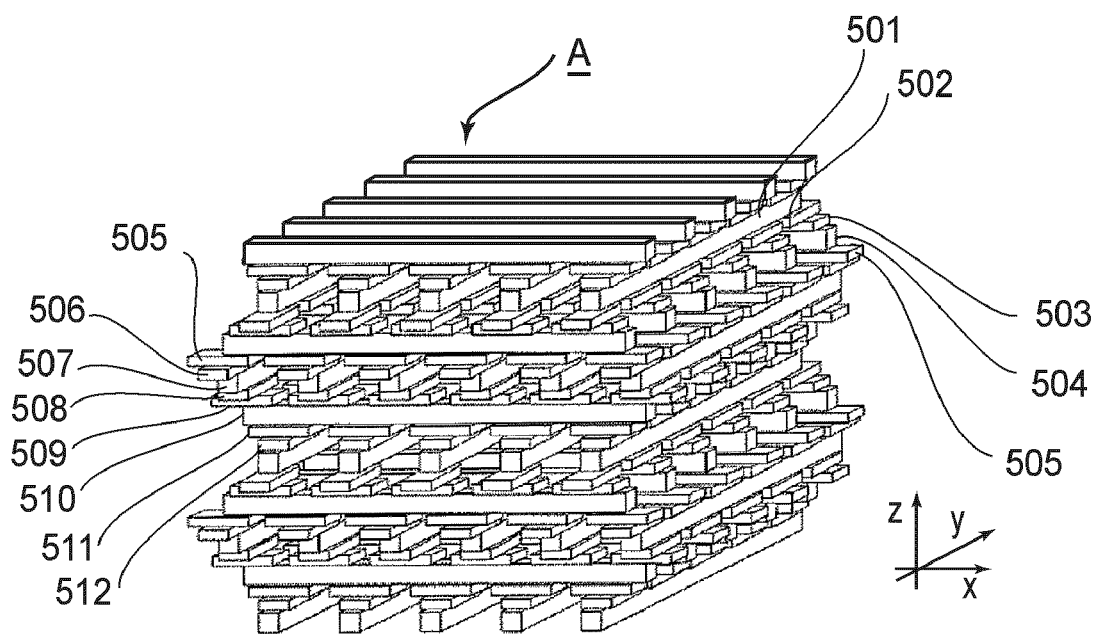
FIG. 6 is a schematic diagram of a three-dimensional photonic crystal according to a fourth embodiment of the present invention.

FIG. 6 is a schematic diagram of a main portion of a three-dimensional photonic crystal "A" having a three-dimensional photonic band gap. The three-dimensional photonic crystal "A" comprises a laminated structure in the Z direction including, as a fundamental period, twelve (12) levels of layers 501-512 containing the x-y plane.

Figure 7:
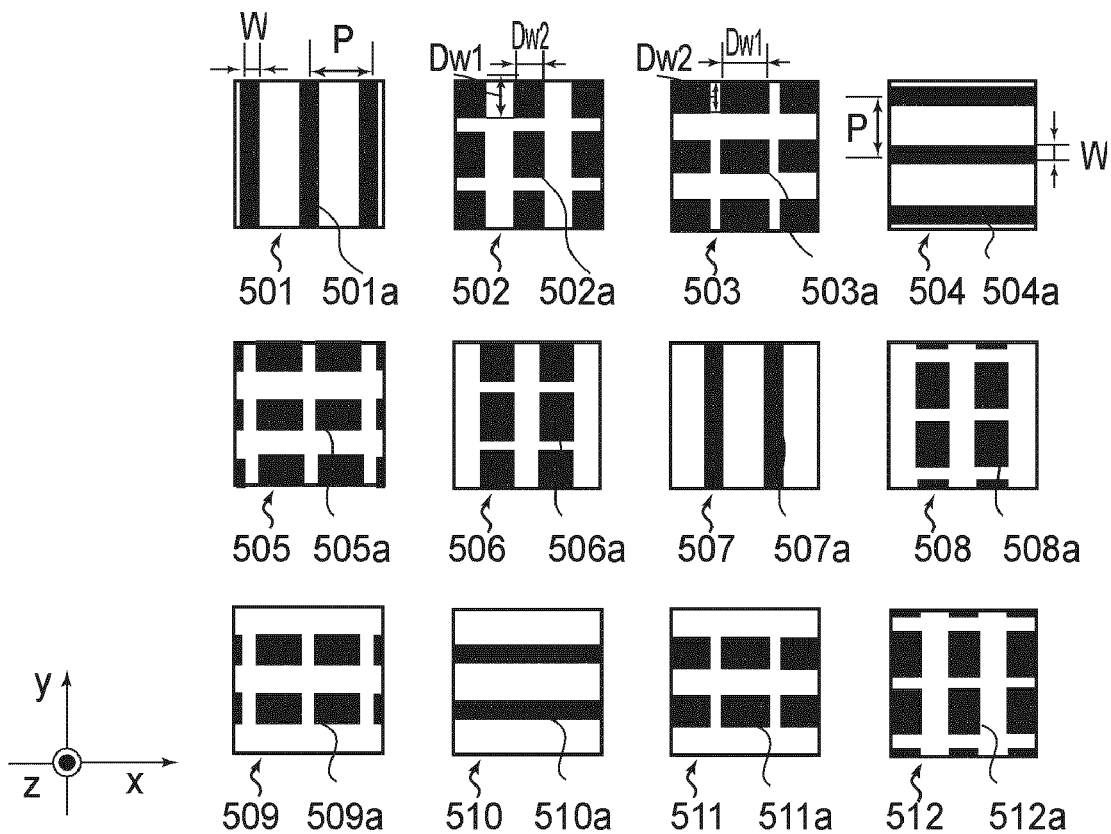
FIG. 7 is a diagram illustrating sections of the three-dimensional photonic crystal of FIG. 6.

FIG. 7 is a schematic diagram showing a portion of x-y sections of the layers 501-512 of FIG. 6. The first layer 501 and the seventh layer 507 have a plurality of columnar structures 501a and 507a extending in the x-axis direction, the columnar structures being disposed in the y direction with regular intervals P. The columnar structure 501a and 507a are made of a first medium, and they are disposed at the positions which are relatively deviated by P/2 in the x-axis direction.

Furthermore, the fourth layer 504 and the tenth layer 510 have a plurality of columnar structures 504a and 510a extending in the y-axis direction, the columnar structures being disposed in the x direction with regular intervals P. The columnar structures 504a and 510a are made of a first medium, and they are disposed at the positions which are relatively deviated by P/2 in the y-axis direction.

The second and third layers 502 and 503 are added layers sandwiched between the first and fourth layers 501 and 504.

The fifth and sixth layers 505 and 506 are added layers sandwiched between the fourth and seventh layers 504 and 507.

The eighth and ninth layers 508 and 509 are added layers sandwiched between the seventh and tenth layers 507 and 510.

The eleventh and twelfth layers 511 and 512 are added layers sandwiched between the tenth layer 510 and the first layer 501 (first layer of the subsequent fundamental period).

In the second layer 502 and the third layer 503, discrete structures 502a and 503a made of a first medium are disposed at the position corresponding to the point of intersection of the columnar structure 501a of the first layer 501 and the columnar structure 504a of the fourth layer 504. Each of the discrete structures 502a and 503a is disposed discretely in the x-y plane so as not to contact with the others.

It is to be noted that the discrete structures 502a and 503a have symmetry so that they overlap with each other when rotated by 90 deg. in the x-y plane. The structure of the fifth layer 505, sixth layer 506, eighth layer 508, ninth layer 509, eleventh layer 511, and the twelfth layer 512, which are between the layers including a columnar structure (e.g., the first, fourth, seventh and tenth layers), is similar to the second layer 502 and the third layer 503.

Namely, discrete structures 505a, 506a, 508a, 509a, 511a and 512a which are provided discretely along the x-y plane are disposed at positions corresponding to the point of intersection of the columnar structures of adjoining layers.

The columnar structures and discrete structures in each layer contact each other. By optimizing the refractive index of the material of the columnar structure and the discrete structure and the shape and spacing of the columnar structure and the discrete structure as well as the thickness of each layer, for example, a complete photonic band gap which is broad in a desired frequency bandwidth (wavelength band) is obtained.

Table 1 shows detailed structural parameters of the three-dimensional photonic crystal structure "A".

Hereinafter, the term "in-plane lattice period" will be used to refer to the spacing P of the columnar structure shown in FIG. 7.

Furthermore, the term "out-plane lattice period" will be used to refer to the fundamental period comprising plural layers. In the three-dimensional photonic crystal structure "A", for example, it corresponds to the length of twelve layers including the first layer 501 through the twelfth layer 512 in the lamination direction.

Furthermore, the refractive index in the table depicts the refractive index of the first medium constituting the columnar structure and the discrete structure of the three-dimensional photonic crystal "A". The second medium of the portion other than the columnar structure and the discrete structure of the three-dimensional photonic crystal "A" is air, and the refractive index thereof is 1.0.

The wording "columnar structure width" refers to the width of the columnar structure in the x direction or y direction. The wording "columnar structure height" refers to the length of the columnar structure in the lamination direction.

Furthermore, the wording "discrete structure width" refers to the length of each discrete structure within the layer, shown in FIG. 7. In Table 1 and FIG. 7, it is depicted at Dw1 and Dw2.

Furthermore, the wording "discrete structure height" refers to the length of each discrete structure in the lamination direction (z direction), and it is depicted at Dh in Table 1.

[Table 1]

TABLE 1

| STRUCTURE "A" PHOTONIC CRYSTAL STRUCTURE | |
|---|---|
| Refractive Index | 2.4 |
| In-Plane Lattice Period | P |
| Out-Plane Lattice Period | 1.4 P |
| Columnar Structure Width | 0.30 P |
| Columnar Structure Height | 0.25 P |
| Discrete Structure Width Dw1 | 0.60 P |
| Discrete Structure Width Dw2 | 0.40 P |
| Discrete Structure Height Dh | 0.05 P |

Figure 8:
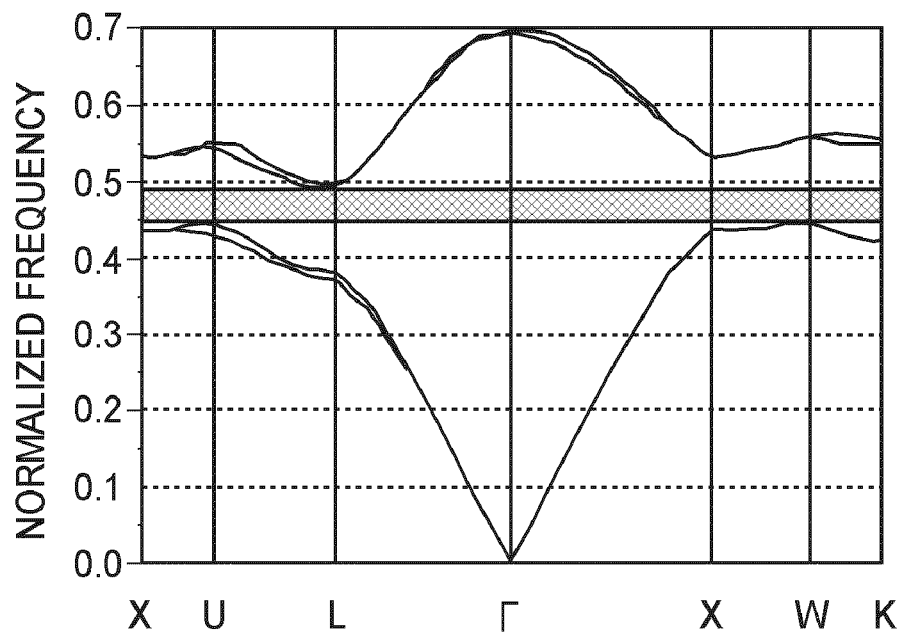
FIG. 8 is a diagram for explaining the photonic band of a three-dimensional photonic crystal.

FIG. 8 is a graph illustrating the results of calculating the photonic band gap of the photonic crystal "A" in accordance with the PWE (plane wave expansion) method.

The axis of ordinate of FIG. 8 depicts the normalized frequency, and the axis of abscissas depicts the wave vector. In the frequency bandwidth shown by hatching, a complete photonic band gap in which light cannot be present regardless of the incidence direction of the light is formed.

Furthermore, if a linear defect member is provided inside the three-dimensional photonic crystal "A", a waveguiding mode having a frequency within the complete photonic band gap is generated.

FIG. 9 is a schematic diagram of a waveguide B according to the present embodiment in which a line defect member is provided inside the three-dimensional photonic crystal "A".

The waveguide B of FIG. 9 includes a first line defect member 50 extending in the y-axis direction, inside the three-dimensional photonic crystal "A" shown in FIG. 6. Furthermore, it has a structure including a second line defect member 500 which is located in a layer different from the layer where the first line defect member 50 is formed and which has been formed by deforming a portion of the columnar structure extending in the y-axis direction.

The defect member width 50w of the first line defect member 50 is 0.60 P, and it is the region made from a medium having the same refractive index as of the medium forming the columnar structure contained in the same layer as the first line defect member 50.

Figure 9A:
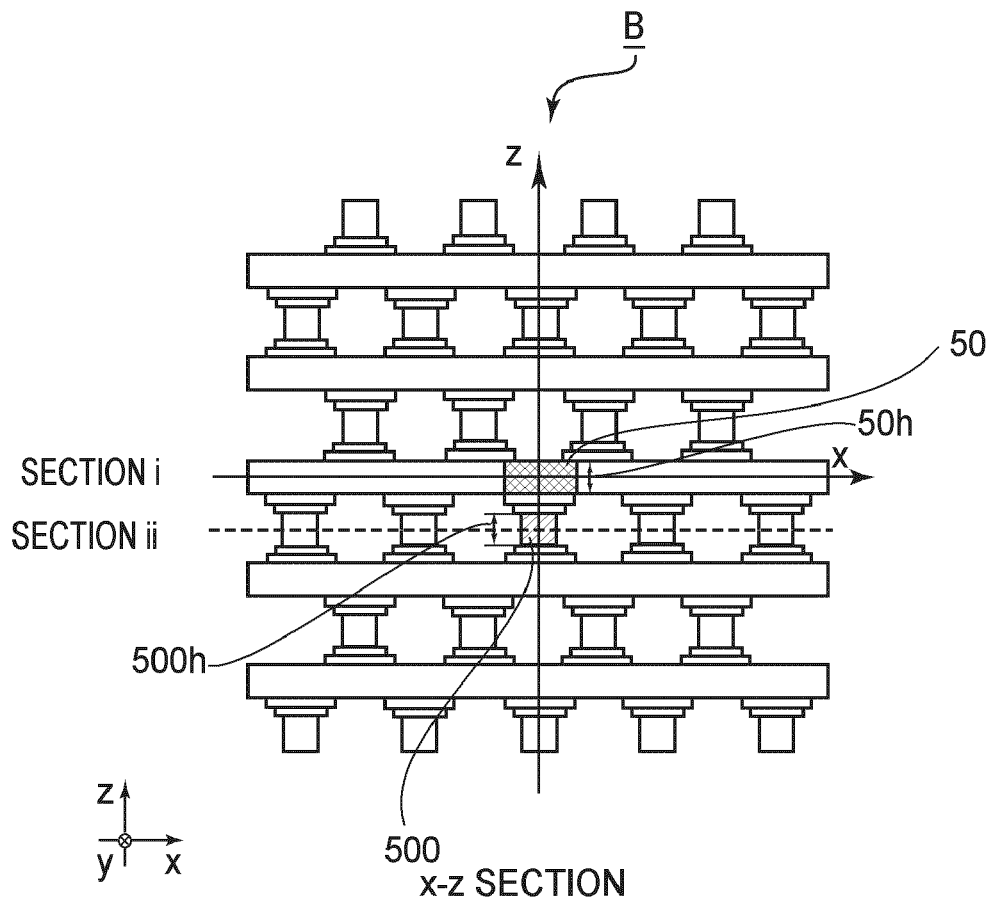
FIGS. 9A-9C are schematic diagrams of a waveguide according to the fourth embodiment.
Figure 9B:
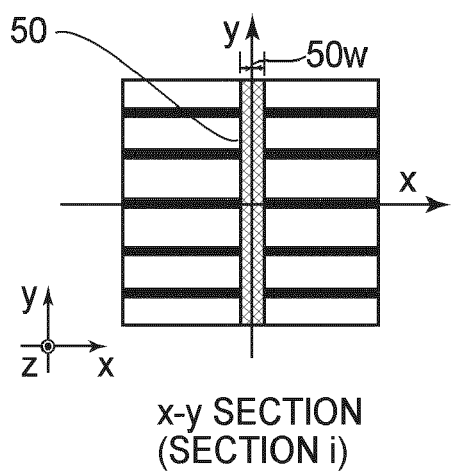
Figure 9C:
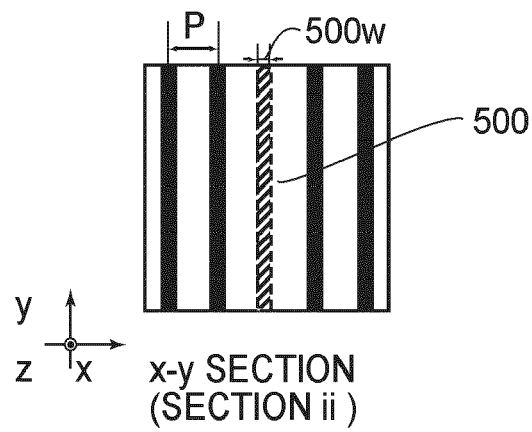

FIG. 9A is an x-z section of the waveguide structure B. FIGS. 9B and 9C are x-y sections of the waveguide B. In the present embodiment, an example, a structure having a first line defect member 50 extending in the y-axis direction and having a defect member width 50w of 0.60 P as well as a second line defect member 500 extending in the y-axis direction and having a defect member width 500w of the columnar structure of 0.00 P, has been explained. Table 2 shows detailed structural parameters of the waveguide B.

Here, the wording "defect member width" refers to the length of each defect member in the x-axis direction within the layer, and it is depicted at 50w and 500w in Table 2 and FIGS. 9B and 9C. Furthermore, the wording "defect member height" refers to the length of each defect member in the lamination direction (z direction), and it is depicted at 50h and 500h in Table 2 and FIG. 9A. Furthermore, the wording "defect member refractive index" refers to the refractive index of the medium constituting each defect member, and it is depicted at 50n in Table 2.

It is to be noted that the origin of the coordinates used in the fourth embodiment is taken at the center of the first line defect member 50 in the x-z section of FIG. 9A.

[Table 2]

TABLE 2

| WAVEGUIDE STRUCTURE "B" | |
|---|---|
| PHOTONIC CRYSTAL STRUCTURE "A" | |
| Refractive Index | 2.4 |
| In-Plane Lattice Period | P |
| Out-Plane Lattice Period | 1.4 P |
| Columnar Structure Width | 0.30 P |
| Columnar Structure Height | 0.25 P |
| Discrete Structure Width Dw1 | 0.60 P |
| Discrete Structure Width Dw2 | 0.40 P |
| Discrete Structure Height Dh | 0.05 P |
| FIRST LINE DEFECT MEMBER 50 | |
| Center Coordinates (x, z) | (0.00 P, 0.00 P) |
| Defect Member Refractive Index 50 n | 2.4 |
| Defect Member Width 50 w | 0.60 P |
| Defect Member Height 50 h | 0.25 P |
| SECOND LINE DEFECT MEMBER 500 | |
| Center Coordinates (x, z) | (0.00 P, 0.35 P) |
| Defect Member Width 500 w | 0.00 P |
| Defect Member Height 500 h | 0.25 P |

Figure 10:
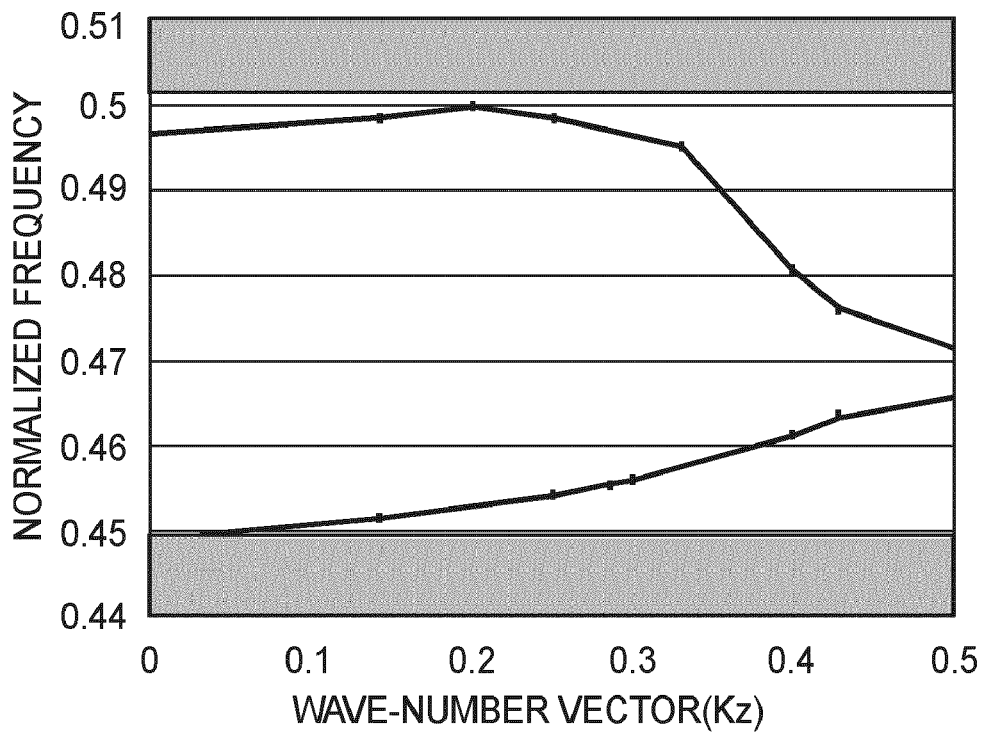
FIG. 10 is a diagram for explaining the wave-guiding mode of the waveguide.

FIG. 10 is a graph illustrating the results of calculating the waveguiding mode of the waveguide B, based on the FDTD method. The axis of ordinate of the graph of FIG. 10 depicts the normalized frequency, while the axis of abscissas depicts the wave vector.

Furthermore, the frequency bandwidth depicted by a thin line illustrates the frequency bandwidth other than the complete photonic band gap. As shown in FIG. 10, in the range from 0.472 to 0.497, there is a frequency band which enables propagation in the single mode waveguiding.

By the way, it is seen from the graph of FIG. 10 that there is no waveguiding mode in the frequency bandwidth of 0.466 to 0.472. This means that the light wave having energy of this frequency bandwidth cannot be present within the waveguide structure B. Hereinafter, this will be called a "mode gap".

By combining the mode gap of the waveguide structure B with the refractive index variation based on the carrier plasma effect, high-speed switching is enabled.

The principle thereof will be explained. In order to control the mode gap, it is effective to modulate the refractive index of the photonic crystal. Particularly, by modulating the refractive index adjacent the waveguide defined by a line defect, the mode gap can be controlled more effectively. For the control of the mode gap, a configuration in which n-type $TiO_2$ and p-type $TiO_2$ are contacted with each other in the vicinity of the waveguide is chosen, and the refractive index can be modulated by injecting an electric current from electrodes provided at opposite ends to induce a carrier concentration change. As a result of this, the effective refractive index of the photonic crystal changes and, thus, the mode gap wavelength can be controlled.

Figure 11:
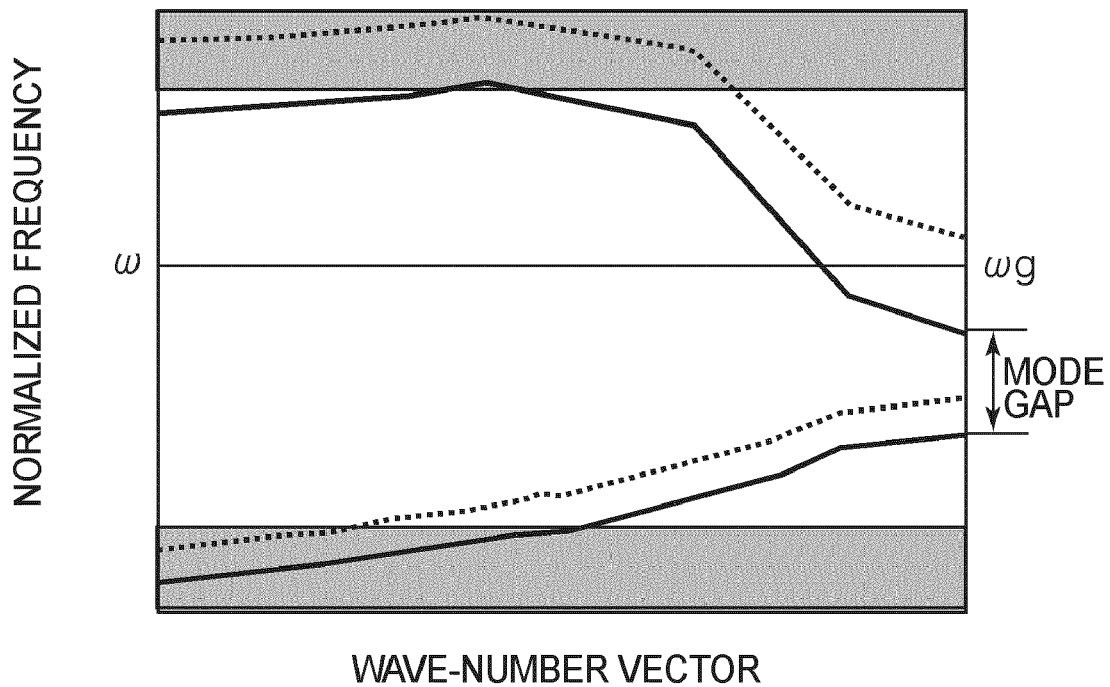
FIG. 11 is a diagram for explaining the mode gap.

Referring to FIG. 11, the axis of ordinate depicts the normalized frequency while the axis of abscissas depicts the wave vector. The thick solid line in the graph illustrates the waveguiding mode before the refractive index is changed, and the dotted line illustrates the waveguiding mode after the refractive index is changed. A horizontal solid line parallel to the axis of abscissas depicts the position of normalized frequency ω. As the carrier density inside $TiO_2$ increases and the refractive index lowers, the effective refractive index of the photonic crystal slows down. As a result of this, the waveguiding mode shifts toward the higher frequency side (shorter wavelength side). Before the refractive index modulation, the waveguiding mode frequency ω coincides with the waveguiding mode frequency ωg, and therefore the light of a frequency ω is propagated in the photonic crystal waveguide. After the refractive index modulation, since the waveguiding mode shifts toward the higher frequency side, there is no waveguiding mode frequency corresponding to frequency ω. Therefore, propagation of the light of a frequency ω is no more possible. By using this phenomenon, the waveguiding of the light can be controlled.

Figure 12A:
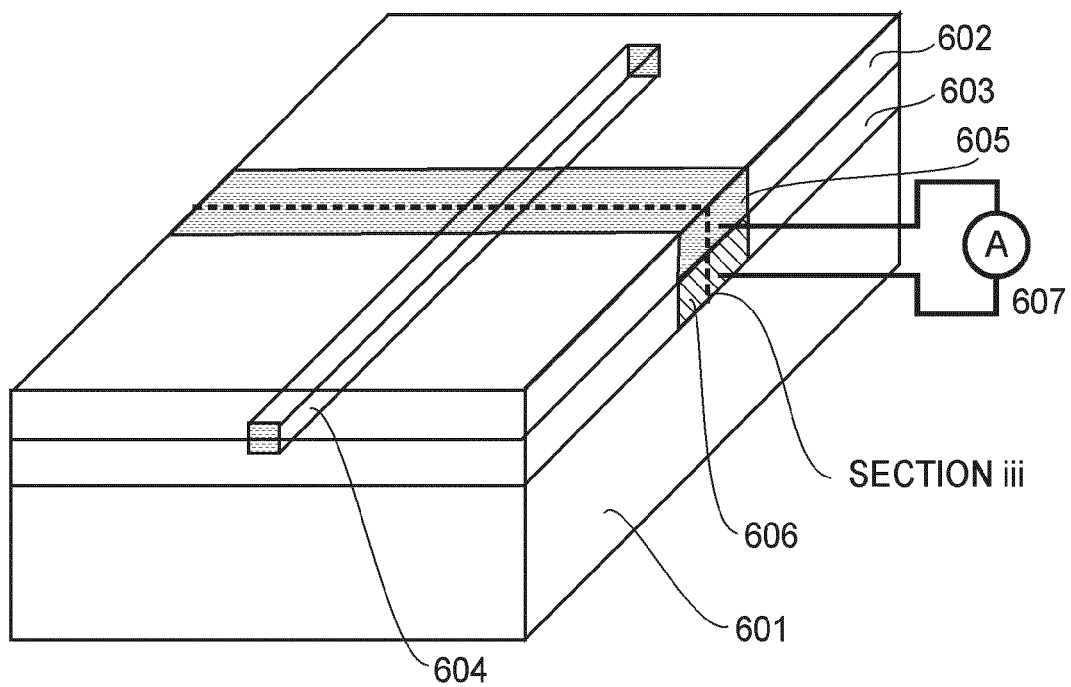
FIGS. 12A and 12B are schematic diagrams of an optical modulation element according to the fourth embodiment.
Figure 12B:
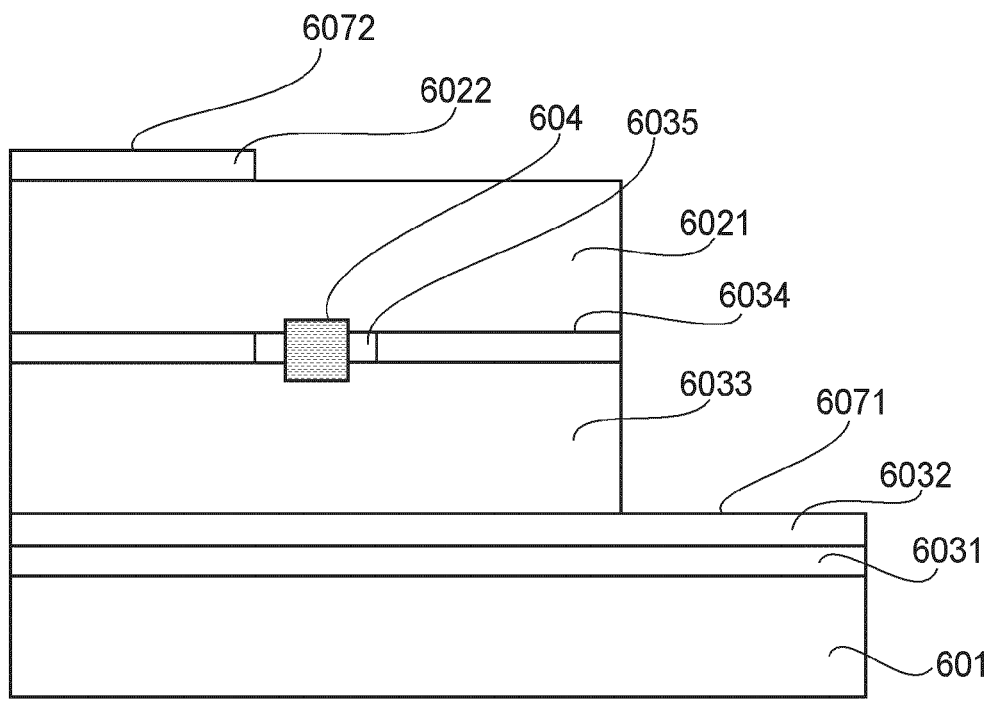

An example of the device structure is shown in FIGS. 12A and 12B. Photonic crystals 602 and 603 and a waveguide 604 which is disposed as a line defect waveguide inside the photonic crystal "A" are provided on a substrate 601. In a portion of the photonic crystals 602 and 603, a photonic crystal 605 made of a p-type $TiO_2$ material and a photonic crystal 606 made of an n-type $TiO_2$ material are provided. There is a current control unit 607 for carrier injection, provided between the photonic crystals 605 and 606. By controlling the carrier pour through the current control unit 607, the refractive index of the waveguide 604 is modulated and the waveguiding mode frequency propagating through the waveguide 604 shifts toward the higher frequency side. Based on this principle of operation, the state of waveguiding the light can be controlled.

The electrode of FIG. 12A is illustrated in FIG. 12B in detail. Mounted on the substrate 601 are a buffer layer 6031, an electrode 6032, an n-type $TiO_2$ layer 6033, a $TiO_2$ layer 6035, a p-type $TiO_2$ layer 6021 and an electrode 6022. Electric wires 6071 and 6072 are connected to the electrodes 6032 and 6022.

The buffer layer 6031 provided between the substrate 601 and the photonic crystal is a layer for improving the crystallinity of the electrode layer 6032, and MgO can be used therefor, as an example. The electrodes 6032 and 6022 should preferably use $TiO_2$ having been doped with Nb as an impurity.

The Nb doped $TiO_2$ film has transparent conductivity with a specific resistance of around $2*10^{-4}$ Ωcm, and it is preferable as an electrode material.

A three-dimensional photonic crystal is constructed in the n-type $TiO_2$ layer 6033. The waveguide 604 may be provided at the interfacial boundary between the n-type $TiO_2$ 6033 and the p-type TiO₂ 6021. Furthermore, the TiO₂ layer 6035 in the waveguide neighboring region, including the waveguide structure, may be formed into a carrier confinement structure such as a hetero-structure by use of n-type TiO₂ having a doping quantity different from TiO₂ or n-type TiO₂ layer 6033.

Furthermore, an insulating member 6034 may preferably be provided as a current constricting structure to more efficiently concentrate the career adjacent the waveguide.

Furthermore, the electrode 6022 and the electric wire 6072 may be so provided to contact the p-type TiO₂ layer 6021 and, in that occasion, a current injection type light guide is accomplished.

Figure 13:
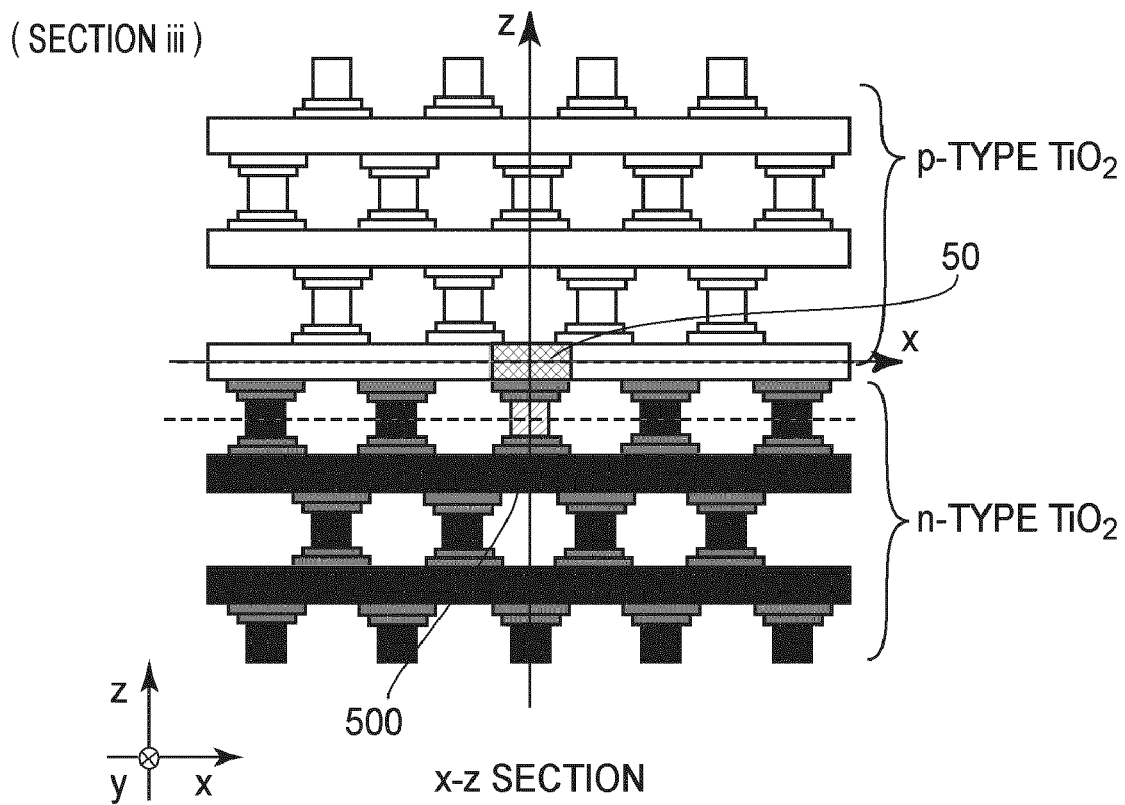
FIG. 13 is a schematic diagram of the optical modulation element according to the fourth embodiment.

FIG. 13 is a sectional view illustrating the section "iii" depicted by a dotted line in FIG. 12A. FIG. 13 illustrates an enlarged view of only the structure of a portion around the line defect waveguide.

In this embodiment, a three-dimensional photonic crystal is constituted while a line defect member 50 constituting a waveguide is taken as a border, wherein the substrate side is n-type TiO₂ and the other side is p-type TiO₂. By injecting an electric current to the structure described above, the carrier concentration in TiO₂ changes, causing a change of refractive index based on the carrier plasma shift. As a result of this, the waveguiding mode frequency shifts and the waveguiding control using the mode gap is enabled.

In the present embodiment, there is no limitation in regard to the region for inducing the carrier concentration change and to apply the refractive index modulation. However, for more effective disposition, the refractive-index modulation region should desirably be disposed at and around (adjacent) the waveguide formed by a line defect.

With regard to the substrate, a material having no absorbency with respect to the waveguiding mode frequency may suitably be used. A transparent and low-conductive material may more preferably be used.

Figure 14:
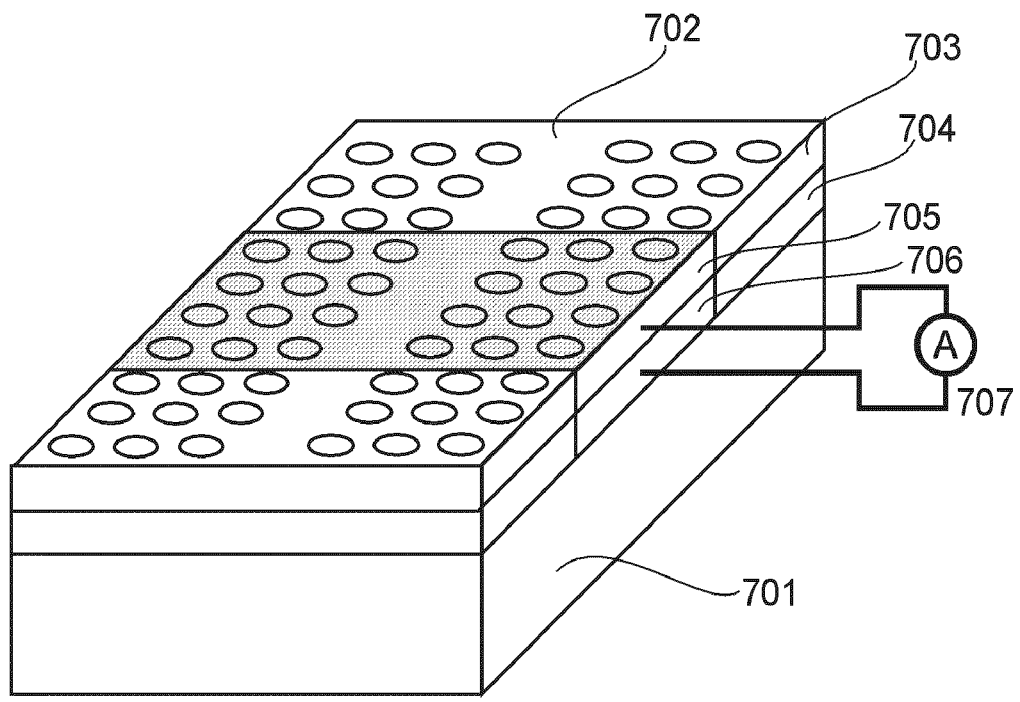
FIG. 14 is a schematic diagram of the optical modulation element according to the fourth embodiment.

Furthermore, with regard to the photonic crystal as well, a two-dimensional structure such as shown in FIG. 14 may be used. In this example, two-dimensional photonic crystals 703 and 704 as well as a line defect waveguide 702 are provided on a substrate 701. The quantity of carrier injection can be controlled by a photonic crystal 705 made of p-type TiO₂ material and a photonic crystal 706 made of n-type TiO₂ material as well as a current control unit 707.

In order to control radiation mode toward the substrate 701 side and for reducing carrier outflow, the substrate may be removed to provide an air bridge structure.

By constituting the two-dimensional photonic crystal with use of TiO₂, the refractive index difference between the substrate 701 and the waveguide 702 can be made large. Also, the light confinement effect due to the refractive index difference between the waveguide 702 and the air can be strengthened.

With structure having been described above, a photonic crystal optical modulator which enables high-speed and high-efficiency modulation is accomplished.

Embodiment 5

Figure 15:
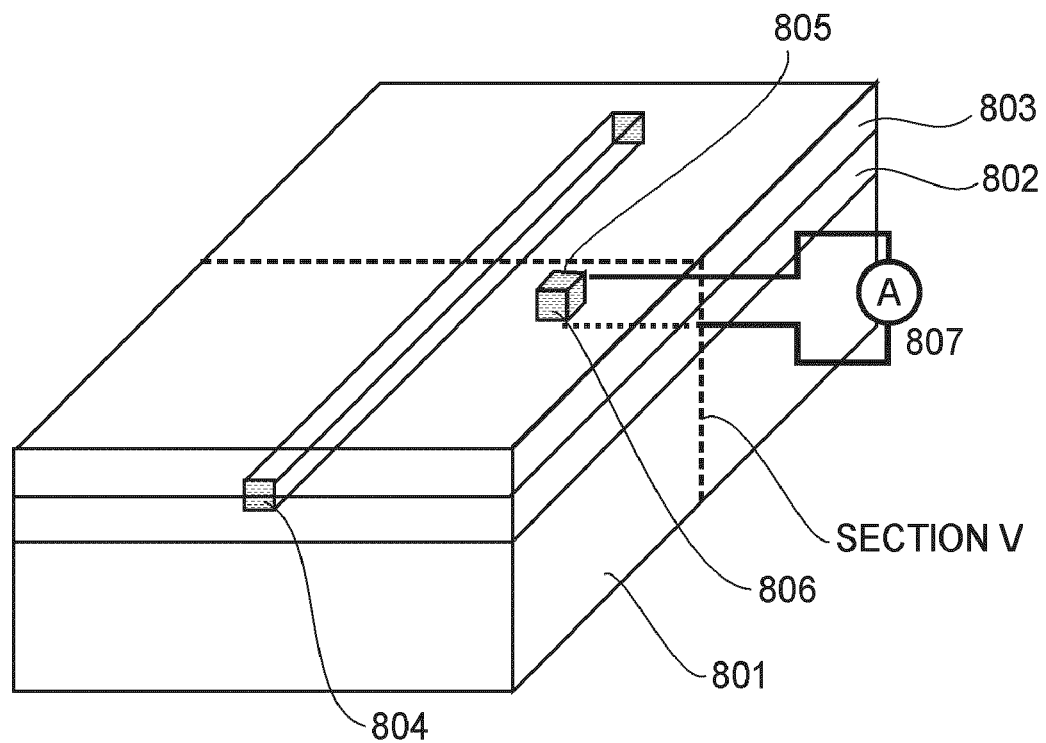
FIG. 15 is a schematic diagram of an optical modulation element according to a fifth embodiment of the present invention.

FIG. 15 is a schematic diagram of a main portion of the optical modulator of the fifth embodiment of the present invention.

Denoted in FIG. 15 at 801 is a substrate, and denoted at 802 and 803 are three-dimensional photonic crystals which include photonic crystals 802a and 803a and a waveguide 804 formed by a line defect in the photonic crystal.

The optical modulator further comprises a resonator 805 based on a point defect, a refractive-index modulation region 806 of the waveguide, and a current control unit 807.

Figure 16:
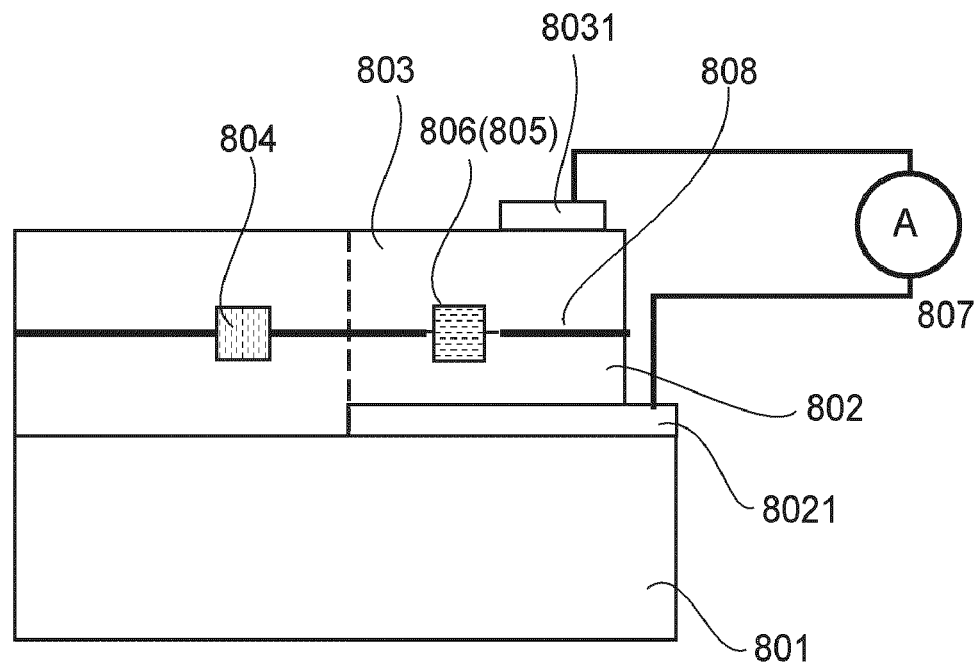
FIG. 16 is a schematic diagram of the optical modulation element according to the fifth embodiment of the present invention.

FIG. 16 is a sectional view of a main portion along a section "v" of FIG. 15. The resonator 805 is sandwiched between the photonic crystal 803 made of n-type TiO₂ material and the photonic crystal 802 made of p-type TiO₂ material.

Denoted at 8021 and 8031 are electrodes for injecting an electric current into the refractive-index modulation region 806. Denoted at 808 is an insulating member which is provided to improve the carrier injection efficiency. The electrodes 8021 and 8031 are made of TiO₂ material having been doped with niobium, this being from the standpoint of transparency and higher conductivity.

Figure 17A:
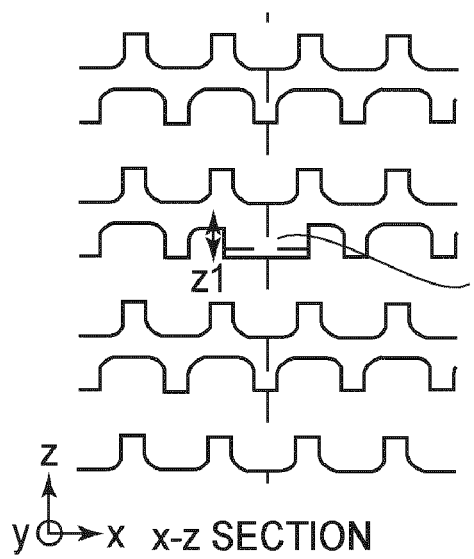
FIGS. 17A and 17B are diagrams for explaining a three-dimensional photonic crystal resonator of the fifth embodiment.
Figure 17B:
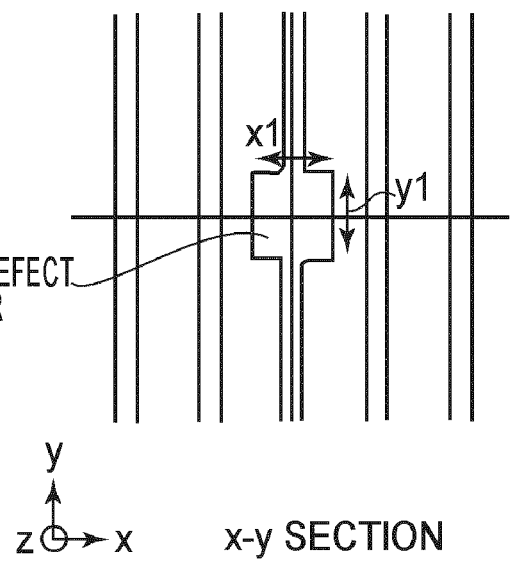

In the fifth embodiment, the photonic crystal "A" described with reference to the fourth embodiment is used as a three-dimensional photonic crystal while the photonic crystal "B" described with reference to the fourth embodiment is used as a waveguide. However, the invention is not limited to this. The structure of the photonic crystal "C" is shown in FIGS. 17A and 17B. Also, the dimensions of the resonator 805 formed by the point defect are shown in Table 3 below.

[Table 3]

TABLE 3

| STRUCTURE "C" POINT DEFECT STRUCTURAL PORTION | |
|---|---|
| Material Refractive Index | 2.4 |
| Defect Structure Width x1 | 1.00 P |
| Defect Structure Width y1 | 1.00 P |
| Defect Structure Width z1 | 0.35 P |

In this embodiment, a resonator 805 which is comprised of a point defect is provided inside the photonic crystals 802a and 803a. Furthermore, the refractive-index modulation region 806 includes the resonator 805.

The resonance mode frequency of the resonator 805 is, if expressed in terms of the normalized frequency, 0.460 and 0.479. At each frequency, it is present in a single mode region with the waveguiding mode of the waveguide "B".

Here, the waveguiding mode frequency for propagation through the waveguide is denoted by $\omega1$. The resonator has a resonance frequency with respect to the frequency $\omega2$. Here, since the light being propagated through the waveguide does not resonate with the resonator, the optical energy would not to be trapped inside the point defect member. Therefore, the light is guided through the waveguide.

Figure 18:
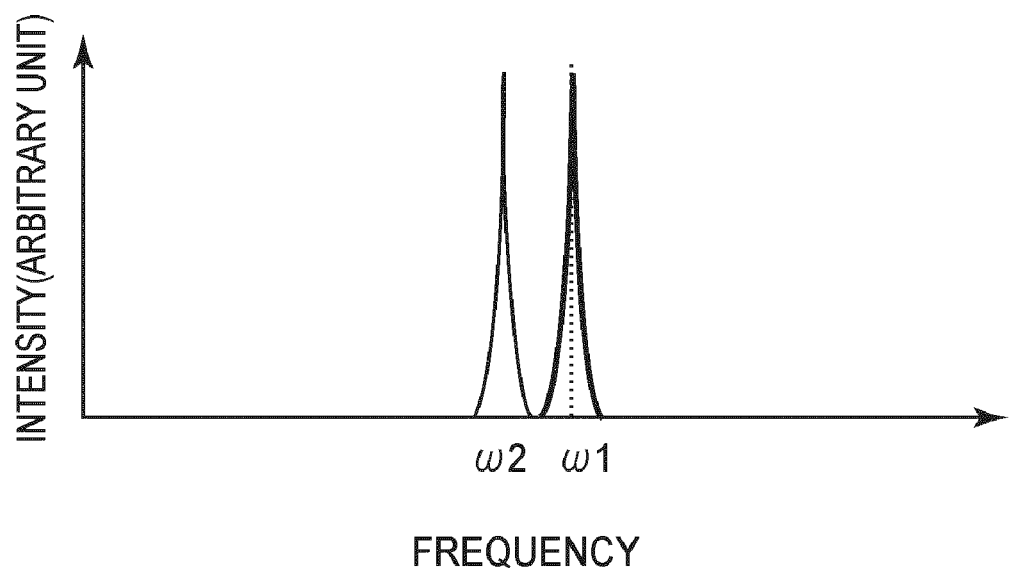
FIG. 18 is a diagram for explaining the resonance frequency control in FIGS. 17A and 17B.

Next, if the quantity of carrier to be injected into the resonator 805 which comprises a point defect is changed by the current control unit 807, a change of refractive index of the medium is induced. As a result of this, the resonance frequency shifts toward the higher frequency side as shown in FIG. 18, and a resonance frequency of frequency $\omega1$ is provided. Then, since the light being propagated through the waveguide satisfies the resonance condition with the resonator, the optical energy is trapped inside the resonator, and the light is no more propagated through the waveguide.

In this manner, in the present embodiment, by using an optical modulation element, the output, from the output waveguides, of the light inputted from the input waveguide is controlled.

Although the present embodiment has been described with reference to an example where a three-dimensional photonic crystal is used, as a matter of course, a two-dimensional photonic crystal may be used.

In the present embodiment as described above, an optical modulation element by which a guided wave frequency can be filtered and high-speed modulation is enabled is accomplished.

As described above, in optical modulation elements according to the preceding embodiments, a material containing $TiO_2$ (titanium oxide) as a main composition is used.

$TiO_2$ is a material having an electric conductivity and semiconductivity. Although $TiO_2$ itself is n-type semiconductor, it may function as a conductive material if a very small amount of metal such as Nb is doped into $TiO_2$. Furthermore, if the composition is transformed to $TiO_{2-x}$ through strong reduction of $TiO_2$, it has a characteristic as a p-type semiconductor In the present embodiment, by joining p-type $TiO_2$ with n-type $TiO_2$, a carrier density change due to the current injection is induced. Namely, high-speed light modulation is realized based on the refractive index change due to the carrier plasma effect.

The speed in which the refractive index change is induced is determined by the diffusion velocity of the carrier, and a response speed of nano-second order can be realized.

The refractive index change relative to the carrier density change is different depending on the material. However, it is known that a refractive index change of around 0.2% is obtainable by a carrier density change of $10^{18}$ $cm^3$.

With the provision of a current constricting structure by use of an insulating material, the injected carriers can be concentrated efficiently. Furthermore, a single hetero-structure or a double hetero-structure may be used as a structure for improving the carrier confinement effect.

In addition, with regard to the material of the optical modulation element, those having high refractive index are desired.

Particularly, if the photonic band gap effect should be utilized effectively, use of a material having a refractive index of 2 or more is desirable.

In consideration of this, as a material which is transparent in the visible light region and which has high refractive index, $TiO_2$ is used.

$TiO_2$ has several advantages such as being low in the material loss within the optical-communication wavelength range and being superior in the refractive index matching with optical fibers. Furthermore, there are features that a film can be formed stably based on the existing techniques such as sputtering, evaporation method, pulsed laser deposition and sol-gel process, for example; and that it is resistive to environmental variation by the heat.

Furthermore, from the standpoint of manufacture processes, using a material containing $TiO_2$ as a main composition and yet using only a single main composition of the material constituting the device, the process for filling or laminating different types of materials can be omitted. As a result of this, unwanted strain to be produced by incomplete adhesion of different materials or a difference in internal stress of the different materials can be prevented. Thus, a device having good operational stability is accomplished.

In accordance with this embodiment, with the structure described above, an optical modulation element which is operable in the visible light region and which can control the light at high speed is accomplished.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2007-188278 filed Jul. 19, 2007, for which is hereby incorporated by reference.

What is claimed is:

1. An optical modulation element, comprising:
   a waveguide defined based on a defect in a photonic crystal;
   a carrier conducting region configured to conduct a carrier to said waveguide;
   an electrode configured to inject a carrier into said carrier conducting region; and
   a current control unit configured to control a quantity of carrier to be conducted to said waveguide;
   wherein said photonic crystal and said electrode are made of a material containing $TiO_2$ as a main composition, and
   wherein said current control unit is configured to change a refractive index of a medium constituting said waveguide in accordance with the quantity of carrier conducted to said waveguide, thereby to modulate light propagated through said waveguide.

2. An optical modulation element according to claim 1, wherein said carrier conducting region includes an n-type $TiO_2$ portion and a p-type $TiO_2$ portion sandwiching said waveguide therebetween, and wherein an insulating member is disposed at a zone of the region sandwiched by the n-type $TiO_2$ portion and the p-type $TiO_2$ portion, other than said waveguide.

3. An optical modulation element according to claim 1, wherein said electrode is made of $TiO_2$ doped with Nb.

4. An optical modulation element according to claim 1, wherein said photonic crystal is formed on a substrate made of a material having a resistance higher than said photonic crystal.

5. An optical modulation element according to claim 1, wherein said waveguide has a structure that a single waveguide is branched into two waveguides which are then combined into a single waveguide, and wherein light being propagated through one of the two branched waveguides is modulated by changing a refractive index of the material constituting said one waveguide.

6. An optical modulation element according to claim 1, wherein a refractive index of a medium constituting one of two waveguides is changed to modulate light being propagated through the one waveguide, such that, through a branch where light being propagated along the two waveguides is branched, light is selectively directed to one of the two waveguides.

7. An optical modulation element, comprising:
   a waveguide defined based on a defect in a photonic crystal;
   a resonator defined based on a defect in a photonic crystal;
   a carrier conducting region configured to conduct a carrier to said resonator;
   an electrode configured to inject a carrier into said carrier conducting region; and
   a current control unit configured to control a quantity of carrier to be conducted to said resonator;
   wherein said photonic crystal and said electrode are made of a material containing $TiO_2$ as a main composition, and
   wherein said current control unit is configured to change a refractive index of a medium constituting said resonator in accordance with the quantity of carrier conducted to said waveguide, thereby to change a resonance mode frequency of said resonator to control waveguiding from said waveguide to said resonator.

8. An optical modulation element, comprising:
   a waveguide defined based on a defect in a photonic crystal;
   a refractive-index modulating region provided around said waveguide;
   a carrier conducting region configured to conduct a carrier to said refractive-index modulating region;

an electrode configured to inject a carrier into said carrier conducting region; and a current control unit configured to control a quantity of carrier to be conducted to said refractive-index modulating region;

wherein said photonic crystal and said electrode are made of a material containing $TiO_2$ as a main composition, and wherein said current control unit is configured to change a refractive index of a medium constituting said refractive-index modulating region in accordance with the quantity of carrier conducted to said refractive-index modulating region, thereby to modulate light propagated through said waveguide.

9. An optical modulation device, comprising:

an optical modulation element as recited in claim 1;

a light source member; and an optical coupling member configured to couple said optical modulation element and said light source member with each other.

10. An optical modulation device according to claim 9, wherein at least a portion of said light source member or of said optical coupling member is comprised of a photonic crystal.

* * * * *